US007434727B2

(12) United States Patent
Bolognini

(10) Patent No.: US 7,434,727 B2
(45) Date of Patent: Oct. 14, 2008

(54) PROCESS AND APPARATUS FOR PROVIDING MARKINGS SECURITY PAPERS

(75) Inventor: Stéphane Bolognini, Lausanne (CH)

(73) Assignee: KBA-Giori S.A., Lausanne (CH)

( * ) Notice: Subject to any disclaimer, the term of this patent is extended or adjusted under 35 U.S.C. 154(b) by 358 days.

(21) Appl. No.: 10/566,744

(22) PCT Filed: Jun. 15, 2005

(86) PCT No.: PCT/CH2005/000334

§ 371 (c)(1), (2), (4) Date: Feb. 1, 2006

(87) PCT Pub. No.: WO2005/123415

PCT Pub. Date: Dec. 29, 2005

(65) Prior Publication Data

US 2007/0012770 A1 Jan. 18, 2007

(30) Foreign Application Priority Data

Jun. 17, 2004 (EP) .................................. 04405371

(51) Int. Cl.
*G06K 5/00* (2006.01)

(52) U.S. Cl. ....................................... 235/380; 235/488

(58) Field of Classification Search ................. 235/380, 235/488, 494, 487; 283/67, 113, 58, 77, 283/112, 94, 85, 89

See application file for complete search history.

(56) References Cited

U.S. PATENT DOCUMENTS 5,401,960 A * 3/1995 Fisun et al. ................. 250/271
5,590,507 A 1/1997 Wyssmann
5,660,106 A 8/1997 Pitz et al.
5,785,353 A * 7/1998 Diamond ..................... 283/67
5,944,356 A 8/1999 Bergmann et al.
6,263,790 B1 7/2001 Wyssmann et al.
6,302,016 B1 10/2001 Fausto et al.
6,505,779 B1 * 1/2003 Power et al. ................ 235/488
6,554,189 B1 * 4/2003 Good et al. ............ 235/462.01
2004/0258274 A1 * 12/2004 Brundage et al. ........... 382/100
2005/0142371 A1 * 6/2005 Swain et al. ................ 428/516

(Continued)

FOREIGN PATENT DOCUMENTS

AU B-63708/90 11/1991

(Continued)

*Primary Examiner*—Thien M Le
(74) *Attorney, Agent, or Firm*—Clifford W. Browning; Krieg DeVault LLP

(57) ABSTRACT

A composite identity marking comprising first and second identity markings is provided on a substrate (1) of a security document. The first identity marking is provided by a first marking station (5, 5', 5", 5'") by bringing a first side of said substrate (1) into marking relationship with said first marking station (5, 5', 5", 5'"). The second identity marking is provided by a second marking station on a portion of the second side of said substrate (1) provided with a layer of material (60) capable of absorbing a substantial amount of radiation emitted by a laser beam. Said laser beam is produced by a laser marking station (6, 6') included in said second marking station and directed onto said layer of absorbing material (60) through the first side of the substrate and across said substrate to form said second identity marking only on said second side of the substrate (1).

21 Claims, 2 Drawing Sheets

U.S. PATENT DOCUMENTS

| | | | | |
|---|---|---|---|---|
| 2006/0145468 | A1 | 7/2006 | Plaschka et al. | |
| 2007/0012770 | A1 * | 1/2007 | Bolognini | 235/435 |
| 2007/0222206 | A1 * | 9/2007 | Schaede et al. | 283/85 |
| 2008/0042427 | A1 * | 2/2008 | Muke | 283/112 |

FOREIGN PATENT DOCUMENTS

| | | | |
|---|---|---|---|
| EP | 0388090 | A1 | 9/1990 |
| EP | 0 625 466 | B1 | 5/1997 |
| EP | 0 768 189 | B1 | 5/2000 |
| EP | 0 737 572 | B2 | 9/2000 |
| EP | 1364809 | | 11/2003 |
| WO | WO 98/36913 | | 8/1998 |
| WO | WO 01/59745 | A1 | 8/2001 |
| WO | WO 03/0995779 | A1 | 12/2003 |
| WO | WO 2004/009371 | A1 | 1/2004 |

* cited by examiner

PROCESS AND APPARATUS FOR PROVIDING MARKINGS SECURITY PAPERS

Applicants claim foreign priority benefits under Title 35 U.S.C. §119 of European Patent Application No. 04405371.8 filed Jun. 17, 2004.

The present invention belongs to the field of the processes and apparatus intended to provide security documents with variable data, each security document receiving an individualized identity marking offering improved security against copies or falsification. The term "security document" designates here primarily banknotes, but also designates documents of any kind having financial value, like cheques, lottery tickets, title deeds, as well as credit cards or identity papers. This list is not limitative. The substrate of security documents is traditionally paper, but can also be made of polymeric foils and plates. The structure of such substrates may be homogenous or layered. The term "identity marking" designates here any sign, readable either by the human eye or by a specific machine, whose characteristics may be varied such that each security paper may thereby be distinguished from any other security paper of the same type. Identity markings include, as examples, but are not limited to, serial numbers, bar codes, geometrical sequences, punchings, magnetically encoded zones, and the like.

The present invention concerns more specifically a process for providing at least one composite identity marking on a substrate of a security document, wherein said composite identity marking comprises a first identity marking and at least one second identity marking, wherein said first identity marking is provided by a first marking station, and wherein said second identity marking is provided by a second marking station, wherein a first side of said substrate is brought into marking relationship with said first marking station.

BACKGROUND OF THE INVENTION

It is already known practice to create security zones on security paper, and in particular on banknotes, by applying images in the form of a film, label or ribbon, so as to make these papers difficult to falsify, particularly to reproduce by the use of photocopiers, the quality of reproduction of which is ever increasing. These images are often optically variable images comprising either a kinegram or a hologram, which has the property of changing appearance, depending on the angle from which they are viewed. These images may be applied either by hot or cold sealing. Machines for applying such images onto otherwise printed banknote sheets are for example described by EP 0625466 or U.S. Pat. No. 6,263,790 or U.S. Pat. No. 6,302,016. Whereas falsifications by means of simple color photocopiers are thereby no longer possible, the affixing of such images does not eliminate falsifications by forgers able to get hold of holograms and the like.

Usually, the identity marking of a security paper comprises a serial number printed on the document. In order to improve the security effect of the usual serial numbers, EP 0768189 teaches to associate an additional alphanumerical security feature to the serial number, borne by a foil or label, which is attached to the security paper by means of a process as mentioned above. According to the process taught by EP 0768189, the information of the foil or label is read, after the fixing step of the foil onto the security paper, by a reading device. The reading device commands a printer, which prints the same information at another place of the security paper, for example in association with the serial number. The identity marking become thus a composite marking, the reproduction or copy of which is more difficult than with the usual serial number alone or with the serial number associated to a hologram image which does not change from paper to paper. This known proposal, however is not quite satisfactory, since each printing process, like the second printing taught by EP 0768189, leads to some misprints, the number of which is low in reliable equipment but never absolutely nil. But users of security documents wish continuously numbered series, and this can not be guaranteed by a marking process comprising the passage through two successive machines. For the same reason, serial numbers are not printed double-sided on banknotes.

Document WO 98/36913 discloses a method of marking a transparent window in a security document, made of a polymeric substrate, substantially transparent to a selected laser radiation. The substrate is covered double-sided with an ink absorbing the same radiation, and submitted to said radiation along a marking path, whereby ink on both sides is ablated along said path. The mark appears as a transparent window. A drawback of this technique is that both markings are necessarily in register and that whereas from one side, an alphanumerical sequence can be read, from the other it is not readily readable, since it is the mirror image of an alphanumerical sequence. A similar solution is disclosed in U.S. Pat. No. 6,505,779.

EP 0737572 and WO 03/099579 disclose marking systems comprising typographic, inkjet or laser printers positioned radially relative to a sheet fed drum for printing serial numbers, bar codes and additional security features. All said features are printed on the same side of the security document facing the printers.

SUMMARY OF THE INVENTION

Therefore the aim of the present invention is to create a process and an apparatus, producing a double-sided composite identity marking on a security document in the course of a same sheet handling step.

This aim is achieved by a process, wherein said second marking station includes a laser marking station for producing a laser beam, wherein a portion of the second side of said substrate is provided with a layer of material capable of absorbing a substantial amount of radiation emitted by the laser beam, wherein the laser beam is directed onto said layer of absorbing material through said first side and across said substrate to form said second identity marking only on said second side of the substrate.

A suitable apparatus for implementing this process comprises a first marking station and at least a second marking station, wherein said apparatus has means for bringing a first side of said substrate into marking relationship with said first marking station and in front of said second marking station, wherein said second marking station is a laser marking station for producing a laser beam and wherein the laser radiation of said laser beam is selected among the radiations capable to pass through the substrate without substantial modification thereof, and capable to react with a predetermined portion of material which absorbs a substantial amount of radiation emitted by the laser beam and which is arranged on the second side of said substrate, said second marking station being arranged in such a manner that said laser beam is directed onto said absorbing material through said first side and across said substrate to form said second identity marking only on said second side of the substrate.

Preferably, the laser is an IR laser with a wavelength of between 0.8 μm and 10.6 μm when the substrate of said security documents is a paper sheet. Preferably, the laser beam has a wavelength of between 0.3 μm and 10.6 μm when the substrate of said security documents is a sheet of polymeric material.

The layer of radiation absorbing material may be any IR absorbent material printed or applied on the substrate. The irradiation shall cause a sufficient temperature elevation to locally evaporate, ablate or burn said layer, or cause locally a photochemical reaction of a photosensitive material, inducing a color change or any other aspect change. For instance, the Optically Variable Devices (OVD) applied on the notes are generally composed of at least a metallic layer that reacts very easily to the laser beam. The material may also be an IR absorbent ink like an offset, intaglio, silkscreen or flexographic ink. The OVI inks, composed of metallic particles, react very well to the laser beam.

The process may provide a third identity marking, or even more, controlled by the same processing unit in the same way as the second marking.

Thus, contrarily to the aforementioned processes of the prior art, wherein the identity markings are either merely printed on one side or necessitate two handlings and additional replacement of misprints, in the process according to the present invention, the first and second identity markings are generated within one handling step in the same marking machine.

Whereas the second marking station is a laser marking station, the first, and eventually further marking stations may use different marking techniques. By way of example, the first identity marking may be achieved by means of a mechanical typography process. The alphanumerical characters may be realized by a set of electromechanical numbering boxes known in the art, wherein the characters selected for each print are controlled by the processing unit. Other techniques, like inkjet processes or embossing processes may be used.

The second identity marking may comprise the same alphanumerical signs as the first identity marking at various locations of the security paper, determined by the affixed foils or labels and/or portions of the second side of the sheet printed with light absorbing ink. Thereby the security document may receive a double-sided serial number.

The second marking may also materialize data calculated from the first identity marking by means of a mathematical or otherwise logical rule.

For avoiding that forgers could be able to find the aforesaid mathematical/logical rule, the data which shall be materialized into a second identity marking may be a randomly generated data, each one of said data being recorded in an authenticating data base in association with a corresponding first identity marking.

Preferably, for rendering falsification more difficult, additional identity markings should not exhibit the same visible signs as the first and/or second identity marking. Such an additional identity marking may be performed for example with non-visible ink.

For providing a plurality of sequentially distributed composite markings on the substrate, the apparatus comprises a processing unit, wherein said processing unit issues sequentially ordered controlled signals to said first and second marking stations, such that each of said stations achieves, on each side of said substrate, sequentially determined markings able to form with corresponding markings achieved on the other side of the substrate a composite identity marking, wherein said second identity marking and said first identity marking of each composite identity marking correspond together by virtue of said linking rule When the sets of security papers are assemblies in form of sheets, where the individual security papers occupy adjacent fields distributed in rows and columns, preferably each marking station comprises a plurality of component marking devices, the operating zone of each marking device corresponding to one column, and the control signals emitted by the processing unit are distributed to the different component marking devices, the signals received by each component marking device being sequentially elaborated by means of the authenticating data base in function of the location of the component marking device.

According to the present invention, it is not necessary to read the first identity marking imprinted on a security paper for determining the second and following identity markings. Nevertheless, it is advisable that after achievement of the complete composite identity markings on a set of security papers, the latter is led to a checking device verifying the correct achievement of the whole composite identity markings. This quality control may be understood as a first authenticating test.

After complete identity marking of the sheets of security papers, the same are cut along in rows and columns, so as to form sequential series of isolated security papers. The security papers may be bundled, the papers of a bundle bearing a continuous sequence of alphanumerical identity marking.

BRIEF DESCRIPTION OF THE DRAWINGS

An example of achievement of the process according to the invention will be described now with reference to the enclosed drawing, which shows in.

DETAILED DESCRIPTION OF THE INVENTION

It is known to sequentially number notes assembled in a sheet issuing from a printing machine wherein a base design of the notes is identically printed on all the fields of the sheet, these fields corresponding each to a single note in such a way that after cutting the sheets into single notes, stacks of sequentially numbered notes are formed. Particular achievements of such a process are described more particularly in U.S. Pat. No. 5,590,507 assigned to the same Applicant, the content of which is herewith incorporated into the present description.

Figure 1:
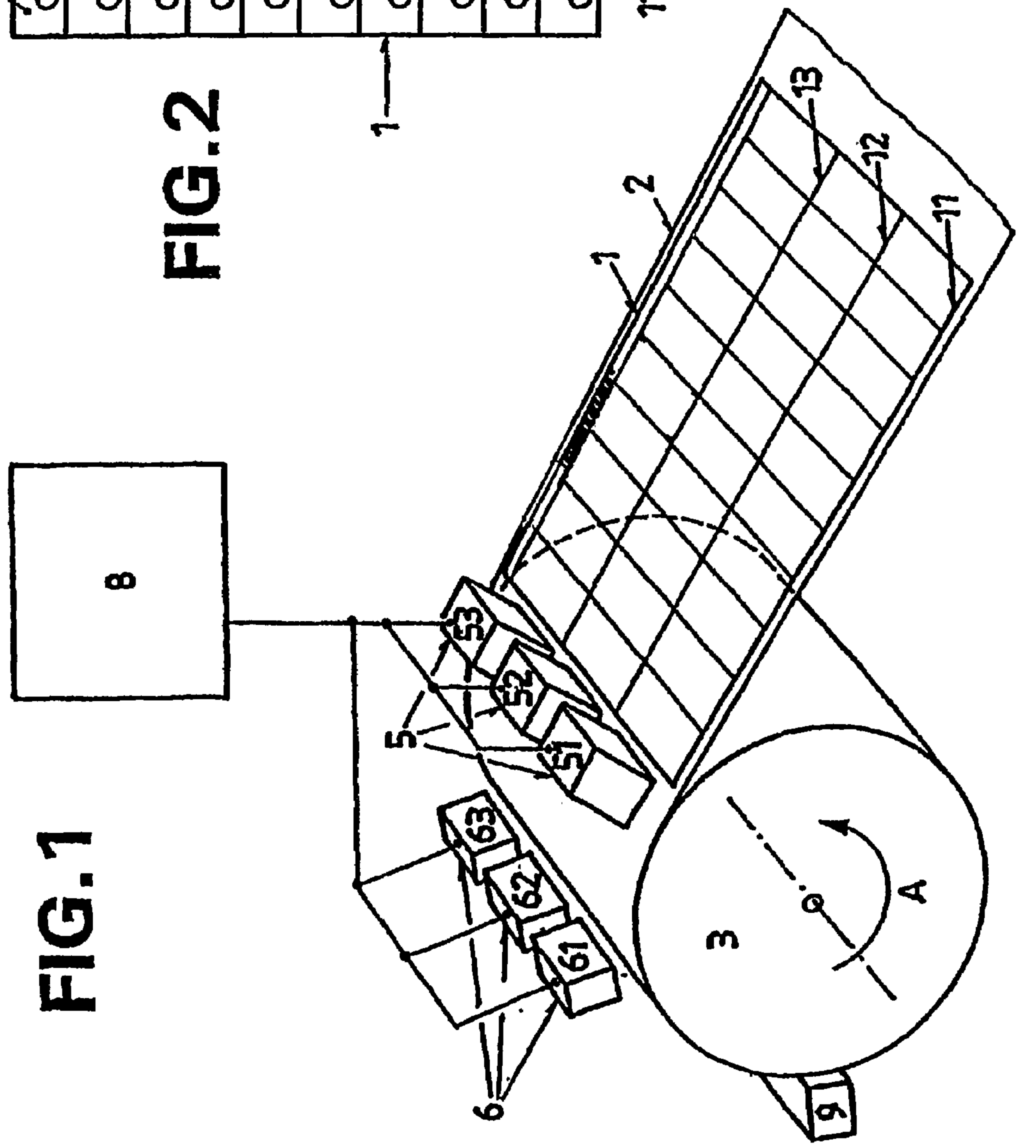
FIG. 1, a schematic and partial representation of an embodiment of a numbering machine for numbering banknotes, FIG. 2, a simplified and schematic representation of a sheet with banknotes in the state at the issue of the numbering machine of FIG. 1, and FIG. 3, a schematic and partial representation of a further embodiment of a numbering machine for numbering banknotes.

Now as shown in FIG. 1 of the enclosed drawing, a sheet 1 is placed on a feeding table 2 and guided towards a drum 3 driven in rotation according to the arrow A and leading the sheet 1 towards the operating zones of a plurality of marking devices as will be described later.

Sheet 1 is divided into a plurality of distinct fields, arranged in rows and columns, each field being intended to form a note. In the example represented in FIGS. 1 and 2, sheet 1 comprises three columns 11, 12, 13 and ten rows 1 to 10, each field having, on FIG. 2, a reference numeral [column, row] 111 to 1310.

Figure 2:
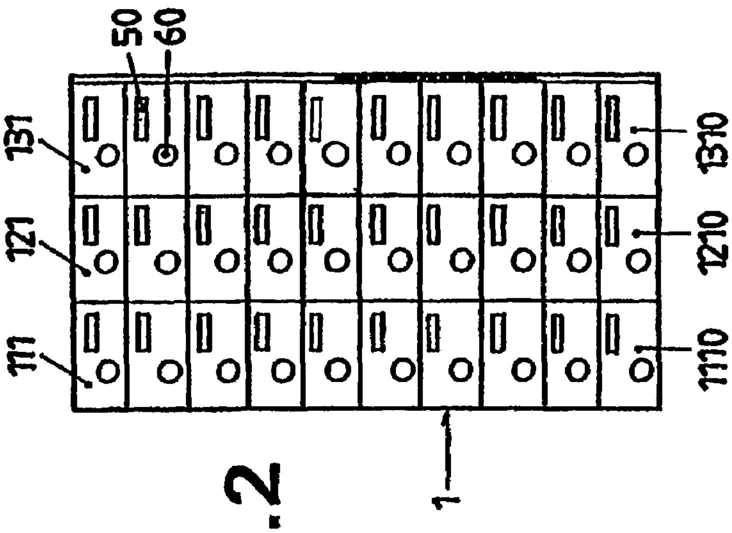

In a previous step, a photosensitive material absorbing in the IR, schematically represented by circles 60 on FIG. 2, was applied on all fields, on the rear side of sheet 1. Suitable materials are IR absorbent labels like OVD or IR absorbent ink like OVI and some offset, intaglio, silkscreen or flexography inks.

The numbering machine shown in FIG. 1 comprises a pair of marking stations 5 and 6, disposed at the periphery of drum 3, spaced around the drum. Each station comprises three similar component marking devices 51, 52, 53 and 61, 62, 63 respectively, localized each in front of one of the columns 11, 12, 13. While the components of station 5 can work according to the technology of mechanical typography, or another technology, e.g. ink-jet technology or embossing technology, components of station 6 work according to laser marking technology. It is also possible to have the components of station 5 placed after the laser marking station 6. Indeed, the location of the laser marking 6, before or after the marking station 5 (or with respect to other marking stations), has no particular importance within the scope of this invention.

The components of the station 5 with mechanical typography can be arranged as taught by U.S. Pat. No. 5,660,106, for example. Mechanical numbering boxes could also be used. Advantages of mechanical typography are magnetic and/or IR security as well as high resolution and slight embossing. On the other hand there is lack of flexibility in terms of fonts and data. Ink-jet technology does not provide such a high resolution. However, this technology provides high flexibility in terms of fonts and change of jobs.

The laser marking station can be a YAG type laser advantageously with a laser source located outside the machine and the laser light transmitted by optical fiber to laser heads mounted on the machine. The power has to be adjusted in order to allow an adequate reaction of the absorbing, and/or photosensitive/reactive material with the laser beam.

Sheet 1 is for instance made of cotton based paper or polymer material with a thickness of about 100 μm, other suitable materials being possible provided the material is substantially transparent to the radiation emitted by the laser. Accordingly, the laser beams of station 6 pass through this substrate without any visible damage to the substrate, whereas a photosensitive/reactive material applied on the opposite side of the substrate absorbs the laser energy. The material is either transformed (like for OVD), ablated (like for IR absorbent inks) or partially ablated in the case of an ink composed of two types of pigments, one transparent to the laser wavelength and the other one absorbent to the same wavelength. In this latter case, a colour change can be observed after marking.

A processing unit 8 sends control signals to all the components 51, 52, 53, 61 62, 63 of the different marking stations. Components 51 and 61 act on the fields of col. 11, components 52 and 62 on the fields of col. 12 and components 53 and 63 on the fields of col. 13. Thus the components of station 5 print a serial number on the front side of the notes at locations indicated by 50 on FIG. 2, and components of station 6 provide on the rear side, at locations of the note indicated by 60 a second partial identity marking, linked to the particular serial number of the note by a mathematical rule as mentioned above.

FIG. 2 shows the appearance of sheet 1 after having been handled by the numbering machine. Each field 111 to 1310 is provided with a complete identity marking sequentially determining the note. Partial markings 50 are serial number and partial markings 60 on the other side of sheet 1 are, for example, the same serial number, or machine readable image information or other figures linked or related to the serial number.

When leaving drum 3, sheet 1 is led to pass in front of a checking device 9, which verify that the identity markings have been correctly provided.

Figure 3:
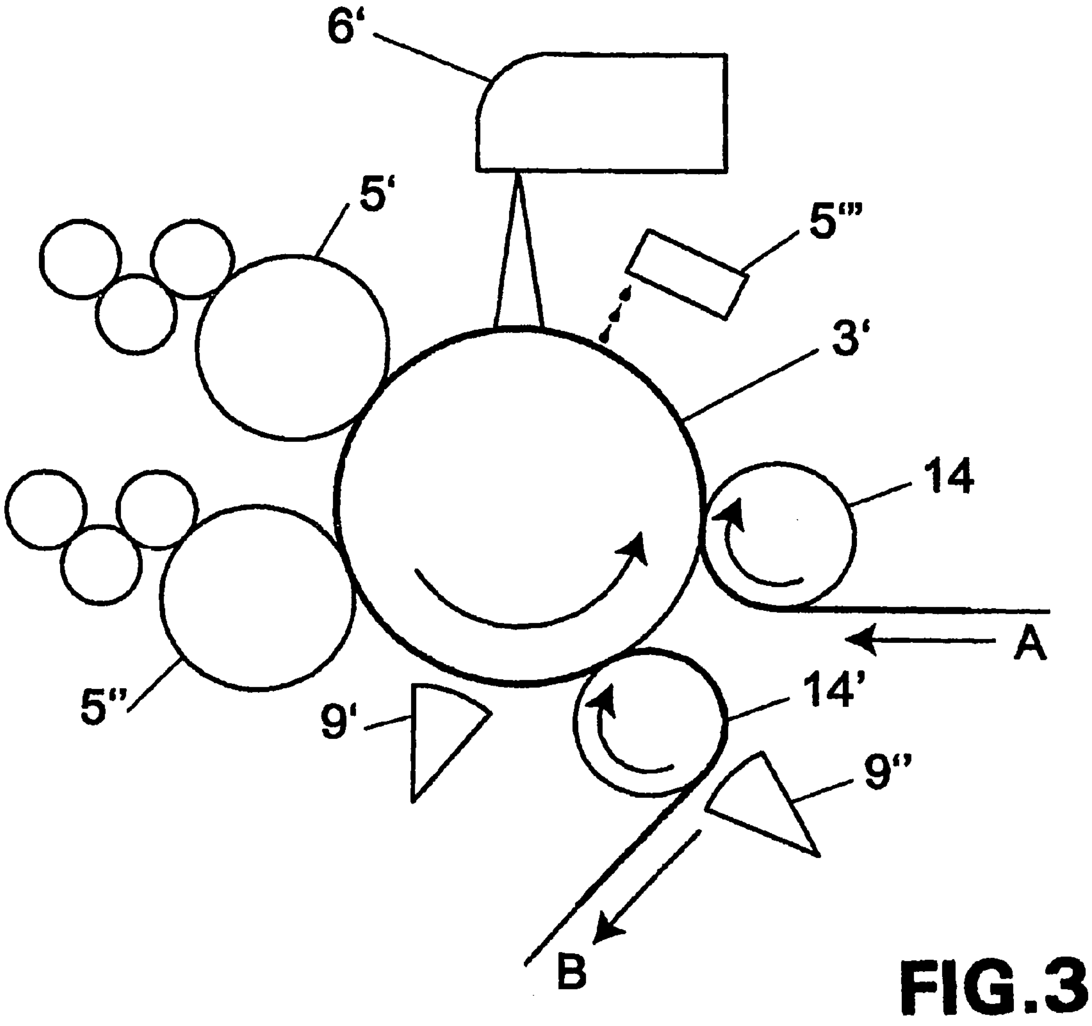

FIG. 3 shows an other embodiment of a marking apparatus comprising a higher number of partial marking devices. Sheets are fed to a drum 3' via a feeding roller 14, in the direction of arrow A. They pass first in front of an ink-jet marking station 5''', then in front of a laser marking station 6' and then successively in printing relationship with two typographic printers 5' and 5''. All the four partial markings are determined by a common processing unit (not shown).

The first side of the sheet is checked for erroneous markings by a first checking device 9', while the sheet is still on the drum 3'. A second checking device controls the marking performed by the laser marking station 6' after passage of the sheet over an exit/transfer roller 14', the sheet leaving the apparatus in the direction of arrow B.

The further cutting and bundling operations may be performed as taught by U.S. Pat. No. 5,590,507.

Those skilled in the art will understand that a numbering machine as shown by FIG. 3 could be provided with other combinations of marking stations, like an ink-jet station and a typographic station for marking the first side and two laser marking stations for providing two different markings on the second side, for example a marking on an affixed label and a marking on a portion printed with IR-light absorbing ink.

Those skilled in the art will also understand that the components 51, 52, 53 of the marking station 5 and the components 61, 62, 63 of the marking station 6 could be located on successive drums, on the same machine

The invention claimed is:

1. A process for providing at least one composite identity marking on a substrate of a security document, wherein said composite identity marking comprises a first identity marking and at least one second identity marking, wherein said first identity marking is provided by a first marking station, wherein said second identity marking is provided by a second marking station, wherein a first side of said substrate is brought into marking relationship with said first marking station, wherein said second marking station includes a laser marking station for producing a laser beam, wherein a portion of the second side of said substrate is provided with a layer of material capable of absorbing a substantial amount of radiation emitted by the laser beam, and wherein the laser beam is directed onto said layer of absorbing material through said first side and across said substrate to form said second identity marking only on said second side of the substrate.

2. A process as claimed in claim 1, wherein the laser beam has a wavelength of between 0.8 μm and 10.6 μm and wherein the substrate is a sheet of paper.

3. A process as claimed in claim 1, wherein the laser beam has a wavelength of between 0.3 μm and 10.6 μm and wherein the substrate is a sheet of polymeric material.

4. A process as claimed in claim 1, wherein said layer of absorbing material is a layer of an optically variable device (OVD).

5. A process as claimed in claim 1, wherein said layer of absorbing material is an ink layer.

6. A process as claimed in claim 5, wherein said ink layer can be deposited by offset, intaglio, silkscreen or flexographic processes.

7. A process according to claim 1, wherein said first identity marking is achieved by means of a process selected from mechanical typography processes, inkjet processes and embossing processes.

8. A process according to claim 1, wherein said first marking is an alphanumerical marking, and in that said first and second marking stations are controlled by a common processing unit associating said second identity marking to said first alphanumerical identity marking by a mathematical or logical linking rule.

9. A process according to claim 8, wherein a plurality of sequentially distributed composite identity markings comprising first and second identity markings are provided on said substrate, wherein said processing unit issues sequentially ordered controlled signals to said first and second marking stations, such that each of said stations achieves, on each side of the substrate, sequentially determined markings able to form with corresponding markings achieved on the other side of the substrate a composite identity marking, and wherein said second identity marking and said first identity marking of each composite identity marking correspond together by virtue of said linking rule.

10. A process according to claim 8, wherein each said second identity marking is univocally determined by means of said linking rule, said linking rule being an algorithmic rule or a sequence of data stored in an authenticating database.

11. A process as claimed in claim 1, wherein said second identity marking corresponds to said first identity marking by rules of symmetry, such that the information provided by the second marking appears identical, when the substrate is viewed from the second side, to the information provided by first marking when the substrate is viewed from the first side.

12. A process according to claim 1, wherein said substrate includes a set of security documents which are assembled in form of a sheet where individual security documents occupy adjacent fields distributed in rows and columns, and wherein a composite identity marking is provided on each of a plurality of said individual security documents.

13. A process according to claim 1, characterized in that after achievement of each complete composite identity marking on said substrate, the latter is led to a checking device verifying the achievement of the identity markings.

14. A process according to claim 12, wherein a plurality of sheets bearing sets of security documents are processed and wherein said sheets, after complete identity marking, are cut in rows and columns, and are processed to form sequential series of isolated security documents.

15. A process according to claim 1, wherein said first and second identity markings are provided on said substrate while the substrate is borne on a same processing drum or cylinder.

16. An apparatus for providing at least one composite identity marking on a substrate of a security document, wherein said composite identity marking comprises a first identity marking on a first side of said substrate and at least one second identity marking on a second side of said substrate, said apparatus comprising a first marking station and at least a second marking station, wherein said apparatus has means for bringing a first side of said substrate into marking relationship with said first marking station and in front of said second marking station, wherein said second marking station is a laser marking station for producing a laser beam and wherein the laser radiation of said laser beam is selected among the radiations capable to pass through the substrate without substantial modification thereof, and capable to react with a predetermined portion of material which absorbs a substantial amount of radiation emitted by the laser beam and which is arranged on said second side of said substrate, said second marking station being arranged in such a manner that said laser beam is directed onto said adsorbing material through said first side and across said substrate to form said second identity marking only on said second side of the substrate.

17. An apparatus according to claim 16, wherein said first identity marking is an alphanumerical marking and in that first and second marking stations are controlled by a common processing unit associating said second identity marking to said first alphanumerical identity marking by a mathematical or logical linking rule.

18. An apparatus according to claim 17, for providing a plurality of sequentially distributed composite identity markings on said substrate, wherein said processing unit issues sequentially ordered controlled signals to said first and second marking stations, such that each of said stations achieves, on each side of said substrate, sequentially determined markings able to form with corresponding markings achieved on the other side of the substrate a composite identity marking, and wherein said second identity marking and said first identity marking of each composite identity marking correspond together by virtue of said linking rule.

19. An apparatus according to claim 16, for processing substrates each including a set of security documents assembled in form of a sheet where the individual security documents occupy adjacent fields distributed in rows and columns, wherein each marking station comprises a plurality of component marking devices, wherein the operating zone of each marking device corresponds to one column, and wherein the processing unit is programmed so that control signals are distributed to the different component marking devices, the signals received by each component marking device being sequentially elaborated by the processing unit in function of the location of the component marking device.

20. An apparatus according to claim 16, further comprising a checking device verifying the achievement of the composite identity marking.

21. An apparatus according to claim 16, wherein said means for bringing the substrate into marking relationship with said first and second marking stations is a processing drum or cylinder.

* * * * *